Figures 1, 2:
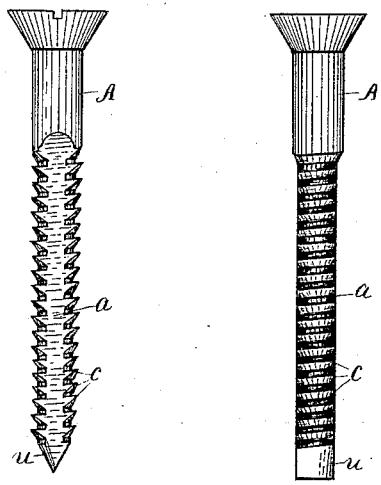

(No Model.)

G. P. ROSE.
SCREW.

No. 411,202. Patented Sept. 17, 1889.

Witnesses.
Jno. C. Perkins
E. D. Chase

Inventor,
George P. Rose
By Lucius C. West
Atty

UNITED STATES PATENT OFFICE.

GEORGE P. ROSE, OF FENTON, MICHIGAN.

SCREW.

SPECIFICATION forming part of Letters Patent No. 411,202, dated September 17, 1889.

Application filed May 31, 1888. Renewed July 22, 1889. Serial No. 318,195. (No model.)

*To all whom it may concern:*

Be it known that I, GEORGE P. ROSE, a citizen of the United States, residing at Fenton, county of Genesee, State of Michigan, have invented a new and useful Screw, of which the following is a specification.

This invention has for its object certain improvements in screws, substantially as herein described and claimed.

In the drawings forming a part of this specification, Figure 1 is an elevation looking against the right side of Fig. 2, and Fig. 2 is a view looking against the left side of Fig. 1.

Referring to the letters marked on the drawings, A is a screw having the ordinary screw-head with slot to receive the screw-driver. The threaded part of the screw is flat on two opposite sides, as at $a$. The threads $c$ are a short space apart and are on the two other opposite sides of the screw. The body of the screw in said spaces is vertically straight and is circular, or nearly so, in cross-section. The upper surface of the threads is at right angles to the screw and their lower surface is beveled. Thus the screw can be easily driven with a hammer, and the straight spaces between the threads form a bearing in the wood when turning the screw with a screw-driver after having been partly driven with a hammer, and the screw, although driven nearly to place with a hammer, like a nail, cannot be drawn except with a screw-driver.

By giving the screw a quarter-turn the threads come out of the broomed wood at the sides of the screw where the threads are when driven and into the solid wood, and the screw can then be screwed farther in or out.

The screw may have a wedge-shaped point, as here shown, or pointed rounding or otherwise. At $u$ the corners of the wedge-shaped point diagonally opposite to each other are chamfered off, so that the screw will turn easier after it has been driven into the wood.

Having thus described my invention, what I claim, and desire to secure by Letters Patent, is—

1. A screw headed and pointed screw having its threaded part flat on two opposite sides, while the body of the screw is circular in cross-section and vertically straight in the spaces between the threads on the other two sides of the screw, substantially as set forth.

2. A screw headed and pointed screw having its threaded part flat on two opposite sides, while the body of the screw is circular in cross-section, substantially as set forth.

In testimony of the foregoing I have hereunto subscribed my name in presence of two witnesses.

GEORGE P. ROSE.

Witnesses:
GEO. W. LOCKE,
E. D. CHASE.